May 2, 1944.  R. McC. JOHNSTONE  2,348,071
SHAFT COUPLING
Original Filed June 13, 1942
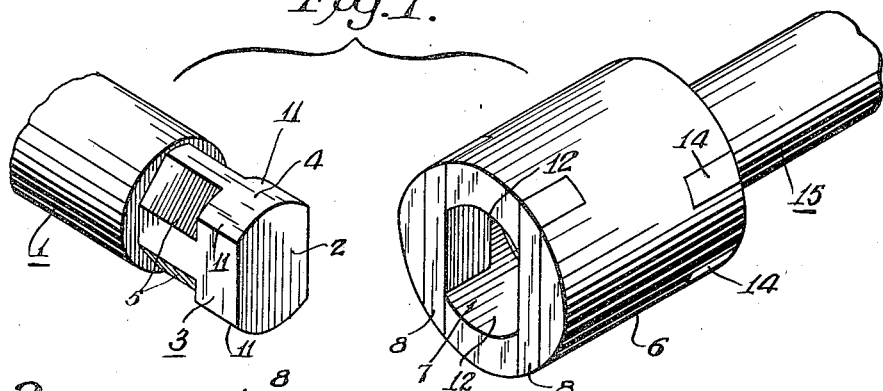
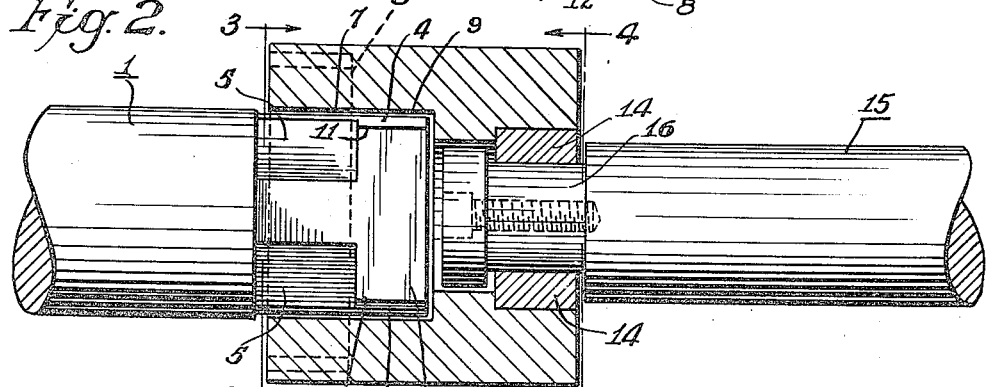
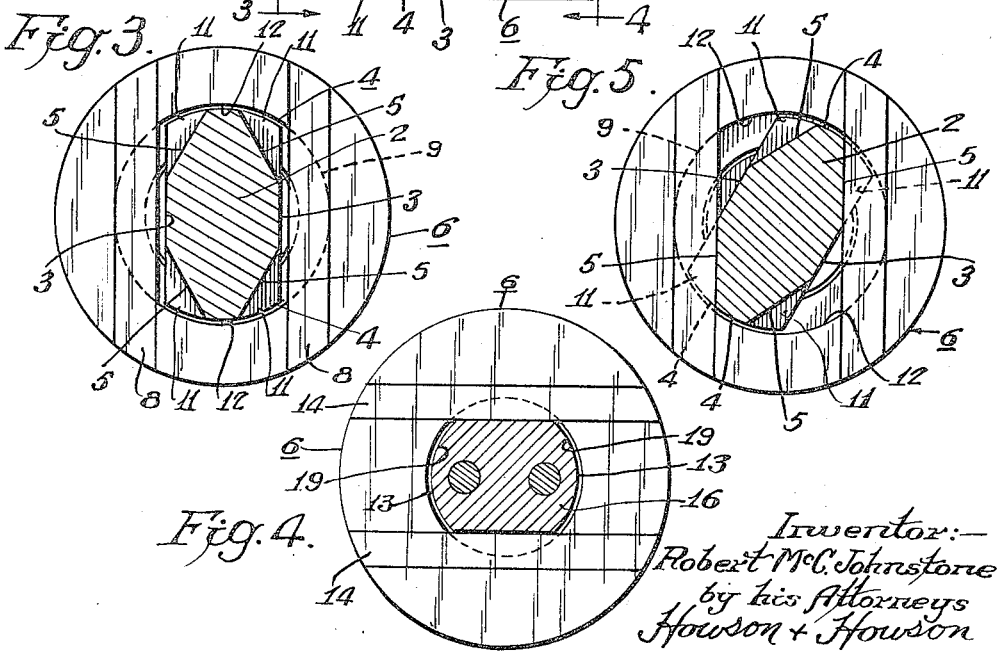
Inventor:—
Robert McC. Johnstone
by his Attorneys
Howson & Howson Patented May 2, 1944

2,348,071

UNITED STATES PATENT OFFICE 2,348,071

SHAFT COUPLING

Robert McC. Johnstone, Bondsville, Pa.

Original application June 13, 1942, Serial No. 446,917. Divided and this application May 5, 1943, Serial No. 485,785

4 Claims. (Cl. 287—113)

The principal object of this invention is to provide a novel and improved form of coupling for shafts and the like. The coupling, while of wide general use, has an application of particular value in machines of the type disclosed in my co-pending application, Serial Number 446,917, filed June 13, 1942, of which the present application is a division.

In the attached drawing,

Fig. 1 is a view in perspective showing the primary elements of the coupling in uncoupled relation;

Fig. 2 is a longitudinal sectional view of the coupling;

Figs. 3 and 4 are sectional views on the lines 3, 3 and 4, 4 respectively of Fig. 2, and Fig. 5 is a sectional view corresponding to Fig. 3 and showing the parts of the coupling in a different position of adjustment.

In accordance with my invention an end of one of the shafts, 1, to be coupled is provided with a terminal tongue 2 having flat sides 3, 3 and rounded top and bottom surfaces 4, 4, the latter surfaces constituting peripheral portions of an unimaginary cylinder coaxial with and of somewhat lesser diameter than the shaft. Within the area where the tongue adjoins the shaft, the longitudinal edges of the tongue are beveled, as indicated at 5, and as illustrated these beveled surfaces terminate short of the outer end of the tongue.

Engageable with the tongue 2 is a sleeve 6, this sleeve having at one end a recess 7 for reception of the tongue. The flat sides of the entering portion of the recess 7 are formed by a pair of hardened steel inserts 8, 8 which are set into the outer end of the sleeve, as best shown in Fig. 1, and which are secured in place preferably by welding. As shown in Fig. 2, the inserts do not extend to the bottom of the recess 7, and the inner end 9 of the recess is cylindrical in transverse section, as indicated by the broken lines in Figs. 3 and 4. When the tongue 2 is fully inserted in the recess 7, as shown in Fig. 2, and the sleeve 6 then turned with respect to the shaft 1, or vice versa, the beveled surfaces 5 will permit the tongue 11 to assume the relative position in the sleeve shown in Fig. 5, wherein the corners 11 of the outer unbeveled portion of the tongue will overlap and will lie behind the inserts 8, thereby locking the sleeve and the shaft together against axial separation. It is to be noted that in the present instance the inner cylindrical portion of the recess 7, and also the walls 12, 12 of the entering slot, which walls are true extensions of the wall of the said inner cylindrical portion, have a diameter only slightly greater than the diametrical dimension between the surfaces 4, 4 of the tongue 2, so that the latter fits with reasonable closeness within the recess.

The other end of the sleeve 6 is provided with a cylindrical opening 13 in axial alignment with the recess 7, and the outer end of this opening is intersected at opposite sides by hardened steel inserts 14, 14 of the same character as the inserts 8, and similarly secured in the sleeve. The second shaft 15 is provided with a projecting generally cylindrical tongue 16 which is flattened at its opposite sides to permit of insertion of the tongue into the opening 13 between the inserts 14, and a cylindrical head element 17 is secured by screws 18 to the end of the tongue 16 after insertion so as to lock the shaft 15 in the sleeve 6.

It will be apparent that when torque is transmitted through one of the shafts to the other, the inertia of the driven shaft will maintain the sleeve and tongue 2 in interlocked relation. The shafts may be readily separated, however, by bringing the tongue 2 into registration with the entering slot of the recess 7 and by then axially separating the shafts.

I claim:

1. In a shaft coupling, a sleeve attached to one of the shafts and projecting beyond an end of the latter, the free end of the sleeve having an axial slotted recess affording access to an undercut coaxial cylindrical chamber, a tongue-like axial projection at an end of the other of the shafts contoured to fit into said slotted recess and having recesses at the sides defining the inner edges of a head-portion adapted to occupy the undercut chamber at the inner end of the recess and permitting a relative angular adjustment of the sleeve and the projection about the shaft axis so as to interlock said head portion with the wall of said chamber, the faces of the said tongue recesses being engageable with the sides of said slot and constituting a means for limiting the extent of said adjustment.

2. A shaft coupling in accordance with claim 1, wherein the axial recess is constituted by a cylindrical bore in the sleeve with hardened steel or other inserts intersecting the opposite sides at the outer end of the bore and defining the opposite sides of the entering slot and the outer end walls of the said undercut.

3. A shaft coupling in accordance with claim 1, wherein both ends of the sleeve are provided with the undercut slotted recesses for reception respectively of tongues on the proximate ends of the shafts, and wherein further the sides of the said slots are defined by hardened steel or other inserts in the coupling sleeve.

4. In a shaft coupling, a sleeve attached to one of the shafts and projecting beyond an end of the latter, the free end of the sleeve having an axial recess comprising a slotted entering portion and an enlarged inner portion, a tongue projecting from the end of the other shaft dimensioned to fit the slotted portion of the said recess and having its longitudinal edges beveled in part, said bevels stopping short of the outer end of the tongue and having a length in the axial direction greater than the depth of the said entering slot of the recess, said bevels permitting rotational movement of the tongue in the slot so as to displace the unbeveled corners at the outer end of the tongue in the enlarged inner end of the recess to a position of interlock with the wall of said recess, and being engageable with the walls of said entering slot to limit the extent of said movement.

ROBERT McC. JOHNSTONE.